United States Patent [19]
Glaser

[11] Patent Number: 5,459,988
[45] Date of Patent: Oct. 24, 1995

[54] QUICK CONNECT RAKE SYSTEM

[76] Inventor: Henry A. Glaser, #20 Herencia Cir., Hot Springs Village, Ark. 71090

[21] Appl. No.: 214,451

[22] Filed: Mar. 18, 1994

[51] Int. Cl.$^6$ .................................................. A01D 7/00
[52] U.S. Cl. ................................. 56/400.17; 56/400.12
[58] Field of Search ..................... 56/400.01, 400.04, 56/400.05, 400.07, 400.12, 400.17, 400.18; 403/72, 68, 80, 389, 396, 400; 294/50.5, 50.6, 50.8, 50.9

[56] References Cited

U.S. PATENT DOCUMENTS

| | | | |
|---|---|---|---|
| 1,588,927 | 6/1926 | Willis | 56/400.12 |
| 2,745,181 | 5/1956 | Czerniewicz | 403/400 x |
| 3,601,966 | 8/1971 | Kerry | 56/400.12 |
| 3,643,410 | 2/1972 | Menning | 56/400.12 |
| 3,688,484 | 9/1972 | Cox | 56/400.12 |
| 4,037,397 | 7/1977 | Fiorentino | 56/400.12 |
| 4,185,448 | 1/1980 | Blanco | 56/400.12 |
| 4,688,961 | 8/1987 | Shioda et al. | 403/389 |
| 4,991,386 | 2/1991 | Dirksen | 56/400.12 |
| 5,058,370 | 10/1991 | Russell | 56/400.12 |

*Primary Examiner*—Stephen J. Novosad
*Attorney, Agent, or Firm*—Stephen D. Carver; Trent C. Keisling

[57] ABSTRACT

A quick connect rake system preferably comprising two rakes or similar yard tools pivoted together by a quick-connect tube system. The tube attaches to the handle of one rake and pivotally couples the handle of a second rake. The tube has a follower slot extending along one of its sides and a hole on the opposite side. The follower slot has an admission orifice at one end to receive the head of a conventional screw to attach the tube to the rake. The remainder of the slot captivates the head of a screw attached to a second rake. The captivation of the screw head pivotally couples the two rakes. The hole in the tube facilitates the permanent attachment of the tube to the rake.

14 Claims, 3 Drawing Sheets

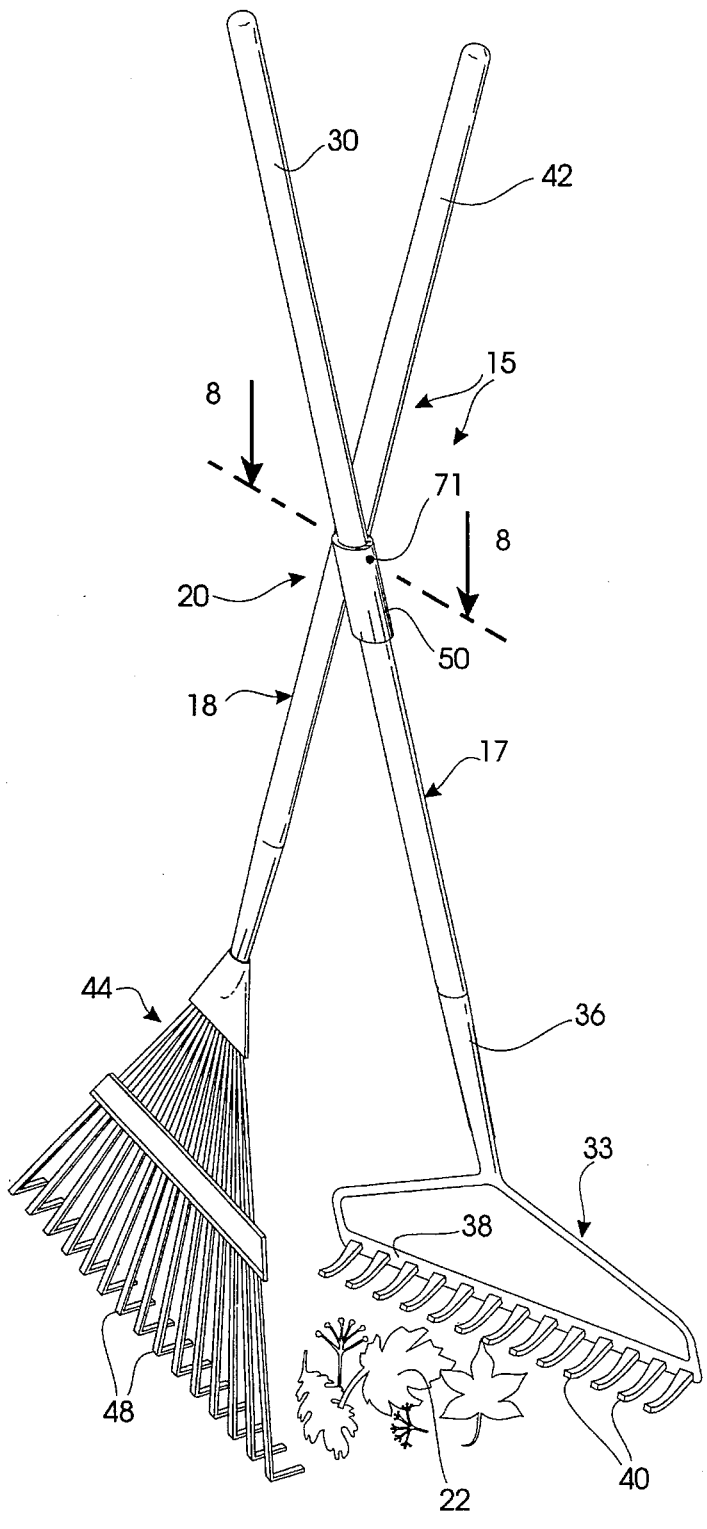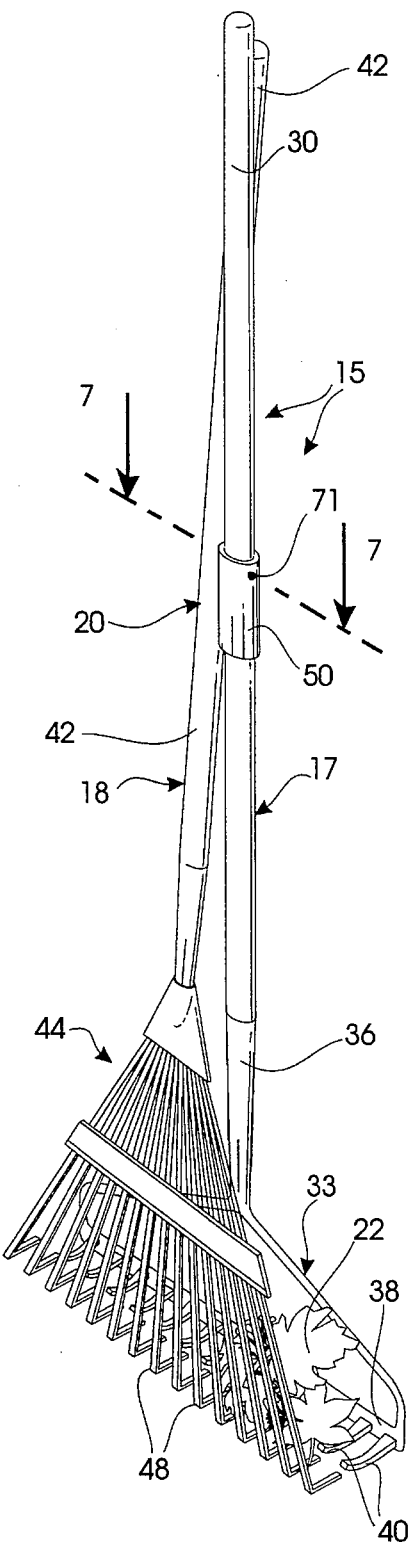

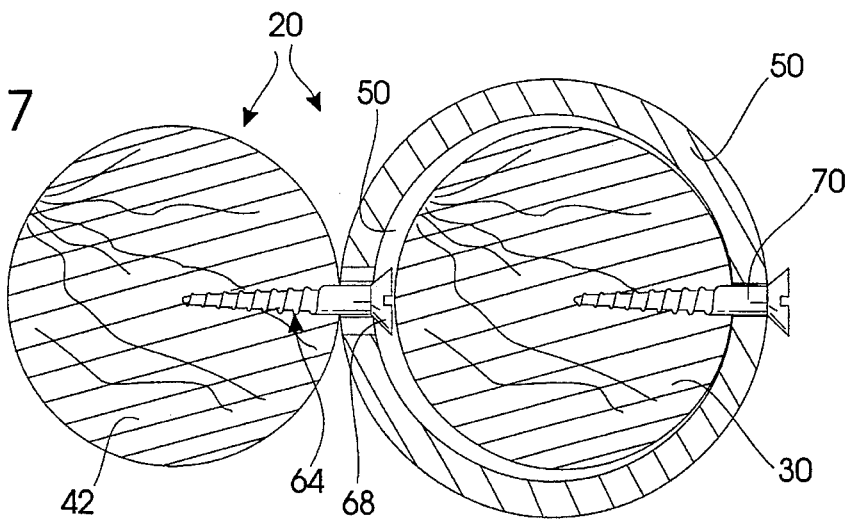
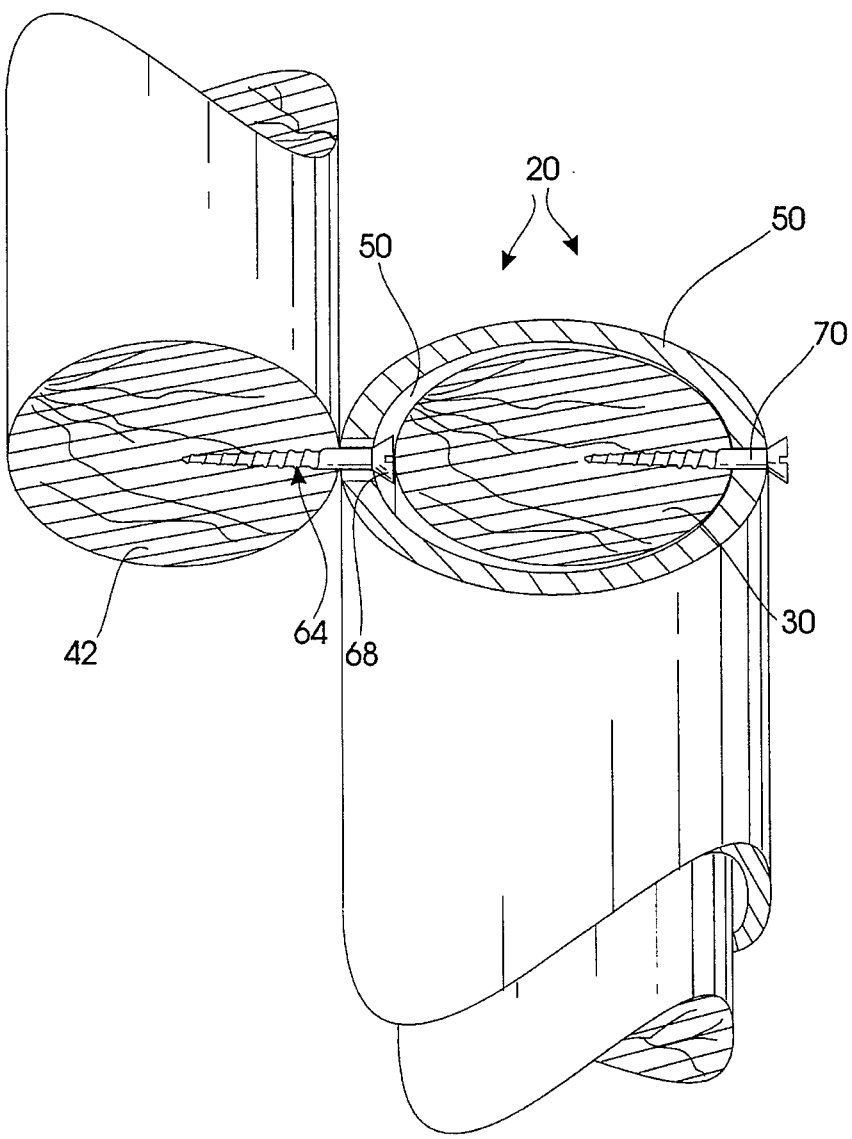

QUICK CONNECT RAKE SYSTEM

BACKGROUND OF THE INVENTION

I. Field of the Invention

The present invention relates generally to yard tools. More particularly, the present invention relates to a quick connect rake system that pivotally couples two rakes or similar yard tools together for cooperative use. Relevant prior art may be found in United States Class 56 and the many subclasses listed thereunder.

II. Description of the Prior Art

As will be recognized by those skilled in the art, rakes and other yard tools are well known. Generally, these types of tools are designed to be used singularly around the yard to sweep leaves, debris or trash into piles for removal. The piles are often manually picked up and placed in trash bags or mulching bins.

However, many times it is undesirable to lift the piles by hand to transfer or remove them. The prior art teaches several devices that facilitate remotely lifting the debris or leaves. One such device is U.S. Pat. No. 3,601,966, issued Aug. 31, 1971, to Kerry. This patent discloses a rake that has a hand operated rake section that linearly moves from a retracted position to an advanced position. When the rake section moves to the advanced position, it holds the leaves or debris between itself and the other rake head.

U.S. Pat. No. 4,037,397, issued to Fiorentino on Jul. 26, 1977, teaches a combination rake and pickup device that comprises two opposing rake heads. The rakes heads are permanently pivotally interconnected.

U.S. Pat. No. 4,185,448, issued Jan. 29, 1980, to Blanco, discloses a rake having two opposing rake heads that lock to allow one of the heads to be used as a rake.

U.S. Pat. No. 5,058,370, issued to Russell on Oct. 22, 1991, teaches a rake having a pick-up element that is hingedly attached to the rear side of the rake. The pick-up element is vertically displaced from the rake head.

U.S. Pat. No. 3,643,410, issued Feb. 22, 1972, to Menning teaches a pair of leaf rakes that are permanently pivotally attached.

All of these devices facilitate picking up or transferring of debris or leaves. Some of the above referenced prior art patents even allow the device disclosed to be used as an ordinary rake. However, the prior art fails to teach a device that permits the temporary coupling of a pair of yard tools, such as a pair of rakes. Ideally, the coupling would allow both tools to be used normally and to be coupled quickly for use as a pickup device.

SUMMARY

My Quick Connect Rake System facilitates the attachment of two rakes (or similar yard tools) together for cooperative use. A coupling tube attached to the handle of one rake pivotally engages the handle of a second rake so that the rakes may be pivoted relative to one another to pick up debris.

The tube has an elongated follower slot extending along one of its sides and a hole on the opposite side. The slot has an orifice at one end to receive the head of a conventional screw to attach the tube to the rake. The remainder of the slot captivates the head of a screw attached to a second rake. This captivation of the screw head pivotally couples the two rakes. The hole in the tube facilitates the permanent attachment of the tube to the rake.

Thus a primary object of the present invention is to provide a simple, readily manufacturable system which can join two rakes (or similar yard tools) together.

A further basic object is to make it much easier to rake and bundle leaves and debris.

Another object of the present invention is to provide a simple system which can readily join two rakes together for cooperative use.

A fundamental object of the invention is to provide a device that will make it possible to join two rakes together in order to pick up grass, debris, leaves, or the like.

A related object is to provide a tool for joining rakes together to make it easier to handle and lift leaves and to deposit them in a mulcher.

Another object of the invention is to provide a system which can be used to fasten lawn brooms together and garden rakes together.

Yet another fundamental object of the present invention is to conserve time and effort when raking.

A related object of the present invention is to provide a raking system requiring minimum maintenance.

A related object is to provide a raking system that will provide increased production and reduce cost.

A fundamental object of the present invention is to provide an easily assembled raking system that can be assembled from diverse yard tools.

A related object of the present invention is to provide a raking system that will enable the rakes to be used normally.

Another fundamental object is to provide a raking system that may be assembled from standard yard tools.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a pictorial view showing my raking system in

FIG. 2 is a pictorial view showing the raking system in a deployed position picking up debris;

FIG. 7 is an enlarged, fragmentary sectional view of the quick connect tube system taken generally along line 7—7 of FIG. 2; and, FIG. 8 is an enlarged fragmentary and diagrammatic sectional view of the quick connect tube system taken generally along line 8—8 of FIG. 1.

DETAILED DESCRIPTION

Figure 3:
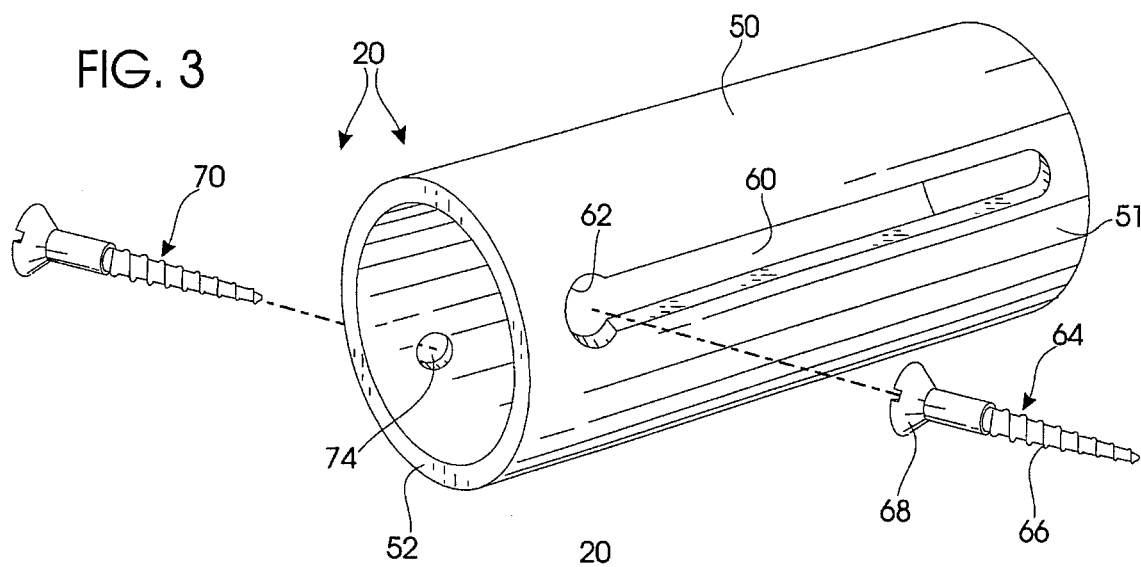
FIG. 3 is an enlarged, fragmentary exploded isometric view of the preferred quick connect tube system.

With reference now to the appended drawings, my Quick Connect Rake System has been generally designated by the reference numeral 15. Rake system 15 preferably comprises a pair of hand tools 17 and 18 (preferably rakes) that are pivoted together for operation by my coupling tube system generally designated by the reference numeral 20. It is important to understand that while rakes have been illustrated in FIGS. 1 and 2, for example, the coupling tube system 20 may be used with a variety of garden tools. By installing system 20 as hereinafter described, rakes 17 and 18 may be employed so that they can more easily pick up debris such as leaves 22. In FIG. 2 the gathered leaves 22 are captivated.

Rake 17 comprises an elongated handle 30 joined to a lower head designated by the reference numeral 33. Head 33 includes a rigid receptor tube 36 integral with a bar 38 having a plurality of outwardly projecting tines 40. Rake 18 is a lawn broom. It comprises an elongated handle 42 coupled to a lower head 44 comprising a plurality of spaced apart tines 48. Rakes 17 and 18 are conventional.

Figure 4:
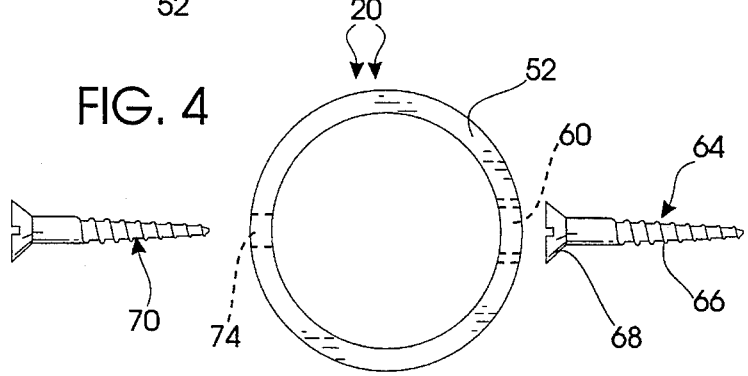
FIG. 4 is an enlarged, exploded end view of the quick connect tube system.
Figure 5:
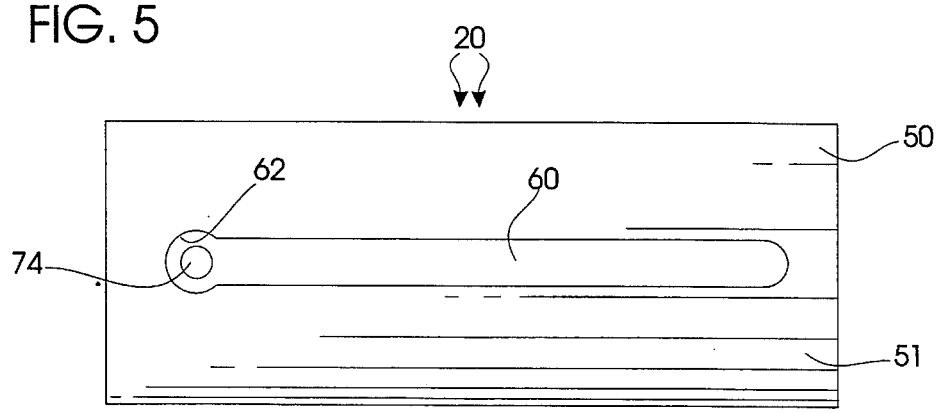
FIG. 5 is an enlarged, side elevational view of the quick connect tube system.
Figure 6:
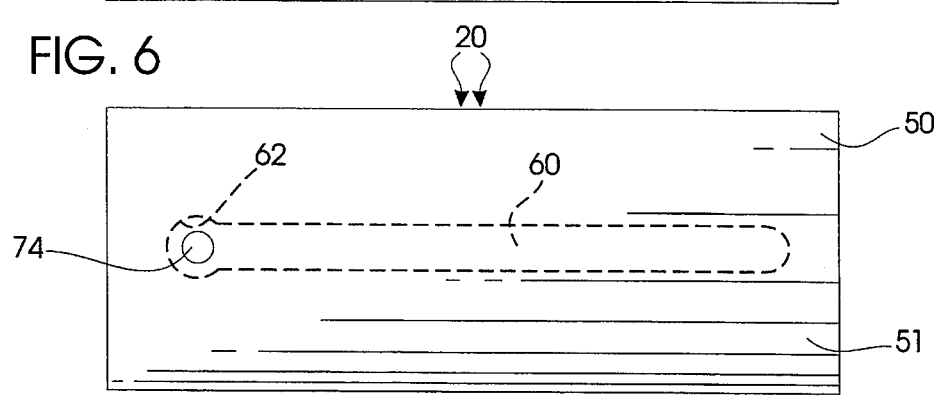
FIG. 6 is an enlarged side elevational view of the quick connect tube system showing the side opposite that of FIG. 5.

The quick connect system 20 (FIG. 3) comprises an elongated tube 50 having a first end 51 and a remote end 52. End 51 is adapted to be positioned at the top of the rake handle (i.e. as viewed in FIGS. 1 and 2). As best seen in FIGS. 3-6, the tube 50 has a circular cross section, but it is of a slightly larger diameter than the diameter of the rake handle 30 (FIG. 7). A slight annulus 50 (FIG. 7 and 8) exists when the tube is fit over the handle of the rake.

An elongated follower slot 60 is defined on one side of the tube. It includes an admission orifice 62 whose diameter is slightly larger than the width of slot 60. A conventional screw or fastener 64 having a threaded shank 66 and a larger head 68 is adapted to be secured into the handle of the rake. When shank 66 is firmly seated within the handle 42, its head 68 may be fitted through admission orifice 62 and is captivated within annulus 50 between the rake handle 30 and the tube 50. Thus, the two rakes are captivated together as the rake 18 and 17 are moved axially to captivate the screw heads 68 within the slot 60. While so captivated, the rakes are held together for pivotal movement as indicated generally in FIG. 8. Preferably another fastener 70, is secured through an orifice 74 to permanently affix the tube 50 to one of the implements or rakes 17. Fastener 70 has a head 71 which is received within orifice 74 externally of tube 50.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A quick connect system for a pair of tools, said system comprising:

a first and second tool each having a work end attached to an elongated handle;

a coupling tube comprising:

a hollow body adapted to be generally coaxially connected to said handle of said first tool;

an elongated follower slot defined on said body; and, a fastener adapted to be attached to said handle of said second tool, said fastener selectively registering within said follower slot to pivotally link said tools.

2. The quick connect system as defined in claim 1 wherein said follower slot comprises an admission orifice, and said fastener comprises a head adapted to be admitted within said admission orifice and captivated within said slot between said tube and said first handle.

3. The quick connect system as defined in claim 2 including a mounting orifice defined in said hollow body, and a fastener for permanently securing said body to said first tool.

4. The quick connect rake system as defined in claim 3 wherein said tools are rakes.

5. A quick connect rake system for gardeners and the like, said system comprising:

first and second rakes each having elongated handles fastened to raking heads;

coupling tube means for pivoting said first and second rakes together for cooperative use so that said raking heads may be selectively pivoted towards one another to pick up debris sandwiched therebetween, said coupling tube means comprising;

a hollow body adapted to be generally coaxially connected to the handle of said first rake;

an elongated follower slot defined on said body; and, fastener means adapted to be attached to the handle of said second rake for selectively registering within said follower slot for pivotally linking said rakes together.

6. The quick connect rake system as defined in claim 5 wherein said follower slot comprises an admission orifice at one end of said slot, said orifice having a diameter larger than the width of said slot.

7. The quick connect rake system as defined in claim 6 wherein said fastener means comprises a head adapted to be admitted within said admission orifice and captivated within said slot between said tube and said first rake handle.

8. The quick connect rake system as defined in claim 7 including a mounting orifice defined in said hollow body, and a fastener for permanently securing said body to said first rake.

9. The quick connect rake system as defined in claim 8 wherein said mounting orifice is oppositely aligned with said admission orifice.

10. The quick connect rake system as defined in claim 9 wherein said raking heads are dissimilar.

11. A quick connect system for pivotally connecting together first and second implements such as rakes or the like, each of said implements characterized by an elongated handle extending from a ground engaging head, said system comprising:

coupling tube means for pivotally coupling said first and second implements together for cooperative use so that said heads may be selectively pivoted towards one another to pick up debris sandwiched therebetween, said coupling tube means comprising;

a hollow body adapted to be generally coaxially connected to the handle of said first implement;

an elongated follower slot defined on said body; and, fastener means adapted to be attached to the handle of said second implement for selectively registering within said follower slot for pivotally linking said implements together.

12. The quick connect system as defined in claim 11 wherein said follower slot comprises an admission orifice, and said fastener comprises a head adapted to be admitted within said admission orifice and captivated within said slot between said tube and said first handle.

13. The quick connect system as defined in claim 12 including a mounting orifice defined in said hollow body, and a fastener for permanently securing said body to said first rake.

14. The quick connect system as defined in claim 13 wherein said mounting orifice is aligned with said admission orifice.

* * * * *